United States Patent
Nakamura

(10) Patent No.: US 7,873,112 B2
(45) Date of Patent: Jan. 18, 2011

(54) ORTHOGONAL FREQUENCY DIVISION MULTIPLEXING (OFDM) RECEIVER, OFDM RECEPTION METHOD AND TERRESTRIAL DIGITAL RECEIVER

(75) Inventor: Yoshiaki Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 776 days.

(21) Appl. No.: 11/729,240

(22) Filed: Mar. 27, 2007

(65) Prior Publication Data

US 2007/0230604 A1 Oct. 4, 2007

(30) Foreign Application Priority Data

Mar. 29, 2006 (JP) ............... 2006-091467

(51) Int. Cl.
*H04K 1/10* (2006.01)
(52) U.S. Cl. ..................................... 375/260
(58) Field of Classification Search ................. 375/260, 375/130, 347; 455/277.1, 63.4; 370/345
See application file for complete search history.

(56) References Cited

U.S. PATENT DOCUMENTS

| | | | | |
|---|---|---|---|---|
| 5,131,006 | A * | 7/1992 | Kamerman et al. | ......... 375/130 |
| 5,239,541 | A * | 8/1993 | Murai | ........................ 370/345 |
| 5,940,452 | A | 8/1999 | Rich | |
| 6,731,921 | B1 | 5/2004 | Militz et al. | |
| 2002/0191535 | A1 | 12/2002 | Sugiyama et al. | |
| 2003/0161428 | A1 | 8/2003 | Garrett et al. | |
| 2004/0202133 | A1 | 10/2004 | Filipovic | |
| 2005/0129155 | A1 | 6/2005 | Hoshino | |
| 2005/0254608 | A1 * | 11/2005 | Lee et al. | ..................... 375/347 |
| 2006/0114812 | A1 | 6/2006 | Kim et al. | |
| 2007/0281654 | A1 * | 12/2007 | Choi | ....................... 455/277.1 |

FOREIGN PATENT DOCUMENTS

JP 2003-229830 A 8/2003

OTHER PUBLICATIONS

Related U.S. Appl. No. 11/725,419, filed Mar. 19, 2007 Inventor: Yoshiaki Nakamura, Title: Orthogonal Frequency Division Multiplexing (OFDM) Receiver, OFDM Reception Method and Terrestrial Digital Receiver.

* cited by examiner

*Primary Examiner*—Chieh M Fan
*Assistant Examiner*—Jaison Joseph
(74) *Attorney, Agent, or Firm*—Holtz, Holtz, Goodman & Chick, PC

(57) ABSTRACT

In an OFDM receiver, one antenna is selected and two moving average integration values (first moving average integration value $A_I$ and second moving average integration value $A_Q$) of a non-delay symbol and a delay symbol are calculated. Another antenna is selected and two moving average integration values (first moving average integration value $B_I$ and second moving average integration value $B_Q$) of a non-delay symbol and a delay symbol are calculated. When a result of an evaluation equation "$A_I/A_Q > B_I/B_Q$" is true, the C/N ratio of the one antenna is judged to be favorable. When the result of the evaluation equation "$A_I/A_Q > B_I/B_Q$" is false, the C/N ratio of the other antenna is judged to be favorable.

18 Claims, 8 Drawing Sheets

| SYMBOL NUMBER | 1 | 2 | 3 | 4 | 5 | 6 |
|---|---|---|---|---|---|---|
| C/N RATIO | 1 | 3 | 5 | 7 | 9 | 11 |
| INTEGRATION VALUE WITHIN GUARD INTERVAL (FIRST MOVING AVERAGE INTEGRATION VALUE) | 5400 | 5280 | 5180 | 5115 | 5100 | 5040 |
| INTEGRATION VALUE OUTSIDE OF GUARD INTERVAL (SECOND MOVING AVERAGE INTEGRATION VALUE) | 600 | 480 | 370 | 330 | 300 | 280 |
| RATIO X | 9 | 11 | 14 | 15.5 | 17 | 18 |

ORTHOGONAL FREQUENCY DIVISION MULTIPLEXING (OFDM) RECEIVER, OFDM RECEPTION METHOD AND TERRESTRIAL DIGITAL RECEIVER

CROSS-REFERENCE TO RELATED APPLICATION

This application is based upon and claims the benefit of priority from the prior Japanese Patent Application No. 2006-091467, filed 29 Mar. 2006, the entire contents of which is incorporated herein by reference.

BACKGROUND OF THE INVENTION

1. Field of the Invention

The present invention relates to an Orthogonal Frequency Division Multiplexing (OFDM) receiver, an OFDM reception method and a terrestrial digital receiver. In particular, the present invention relates to an OFDM receiver, an OFDM reception method and a terrestrial digital receiver to which antenna diversity is applied.

2. Description of the Related Art

The modulation method employed in terrestrial digital broadcasting is Orthogonal Frequency Division Multiplexing (OFDM). OFDM is a form of a multi-carrier method or, in other words, a modulation method for transmitting information using a large number of carriers. Compared to a single-carrier method, OFDM is less influenced by transmission lines (particularly, multipath). OFDM has a buffering period called a guard interval in the head portion of a symbol (a single unit of transmission information). OFDM is considered to be multipath-resistant in this respect, as well.

However, the functions inherent to OFDM (the multi-carrier and the guard interval) are insufficient for a mobile-type OFDM receiver that is likely to be used in a severe environment, such as in a vehicle traveling at high speeds. Therefore, other anti-multipath techniques are used in combination. Typically, antenna diversity is applied.

As an example of an OFDM receiver to which antenna diversity is applied, a technology described in Japanese Laid-Open Patent Publication No. 2003-229830 is known (hereinafter, referred to as conventional prior art). In the conventional prior art, a plurality of antennas receive OFDM signals. The conventional prior art determines a correlation value between each OFDM signal received by each antenna that has been down-converted to the IF band and a delay OFDM signal that is delayed from each OFDM signal by an amount equivalent to a single effective symbol. Then, the conventional prior art calculates a carrier-to-noise (C/N) ratio (a ratio of additional noise power and signal power at a reception point) from the correlation value. The conventional prior art selects an equalization carrier signal with the highest C/N ratio among carrier signals of the same number obtained from each branch circuit and decodes the selected carrier signal.

As described above, the conventional prior art "determines a correlation value between each OFDM signal received by each antenna that has been down-converted to the IF band and a delay OFDM signal that is delayed from each OFDM signal by an amount equivalent to a single effective symbol and calculates a carrier-to-noise (C/N) ratio from the correlation value". Briefly stated, the conventional prior art is interpreted to be "using information of the guard interval".

FIG. 8A is a conceptual diagram of the guard interval in the conventional prior art. Three temporally consecutive symbols (K−1, K, and K+1) are considered, as shown in FIG. 8A. K denotes a current symbol. K−1 denotes a temporally preceding symbol. K+1 denotes a temporally subsequent symbol. The lengths of individual symbol periods T are fixed. For example, the length of the symbol period T in terrestrial digital broadcasting is 1.008 μs (in Mode 3). All symbols include an effective symbol period Tu storing transmission information and a guard interval period Tg (hatched portion) of a constant length added to the head portion of the effective symbol period Tu. A portion (end portion) of the information stored in the effective symbol period Tu subsequent to the guard interval period Tg is copied to the guard interval period Tg of each symbol.

FIG. 8B is a conceptual diagram of a use of the guard interval information in the conventional prior art. In FIG. 8B, a non-delay symbol and a delay symbol are the same symbol (for example, symbol K). The delay symbol is the symbol K delayed by a predetermined amount of time (T−Tg). The delay symbol is equivalent to the "delay OFDM signal" in the conventional prior art. When the correlation between the two symbols (the non-delay symbol and the delay symbol) is evaluated, the evaluated value is a large value during an overlapping period (overlapping periods Y and Z) of the end portion of the effective symbol of the non-delay symbol and the guard interval symbol period Tg of the delay symbol, because the information in Y and Z is originally the same.

The conventional prior art is interpreted to be a technology that evaluates the correlation between the information in Y and Z, and selects and decodes the equalization carrier signal with the highest C/N ratio, based on the principle described above.

However, the following two points can be pointed out regarding the conventional prior art. First, diversity in the conventional prior art is equivalent to a so-called composition diversity. In composition diversity, the signal having the best C/N ratio is selected from among the signals received by a plurality of antennas. Although composition diversity is superior in performance to a method in which a plurality of antennas are switched (selection diversity), composition diversity has a drawback of increased hardware size. Therefore, problems such as an increase in device weight, an increase in power consumption, and an increase in manufacturing cost are unavoidable.

Second, the conventional prior art evaluates the correlation only during the guard interval period Tg. In other words, the conventional prior art does not evaluate the correlation during other periods (effective symbol period Tu). Therefore, if, for example, the state of the transmission line suddenly changes during the effective symbol period Tg, the conventional prior art cannot immediately respond to the change. As a result, instantaneous symbol loss may occur. This drawback cannot be overlooked in an OFDM receiver that may be used in a vehicle traveling at high speeds, because the characteristics of the transmission line changes significantly during a short amount of time corresponding to the traveling speed.

SUMMARY OF THE INVENTION

The present invention has been achieved in light of the first and second drawbacks, described above. An object of the present invention is to provide an OFDM receiver, an OFDM reception method and a terrestrial digital receiver to which selection diversity that does not cause an increase in hardware size can be applied. The OFDM receiver, the OFDM reception method, and the terrestrial digital receiver enable switching (selection) judgment of the antennas even during an effective symbol period, which is a period other than the guard interval period. Moreover, the OFDM receiver, the OFDM reception method, and the terrestrial digital receiver are low in cost and have excellent instantaneous antenna selection.

In accordance with an aspect of the present invention, there is provided an OFDM receiver comprising: an antenna selecting means for sequentially selecting at least two antennas; a non-delay symbol outputting means for, when one antenna is selected by the antenna selecting means, outputting a symbol of an OFDM signal received by the one antenna as a first non-delay symbol and, when another antenna is selected by the antenna selecting means, outputting a symbol of an OFDM signal received by the other antenna as a second non-delay symbol; a delay symbol outputting means for, when one antenna is selected by the antenna selecting means, delaying a symbol of an OFDM signal received by the one antenna by a predetermined amount of time T−Tg equivalent to a difference of a symbol period T of the OFDM signal and a guard interval period Tg and outputting the delayed symbol as a first delay symbol and, when another antenna is selected by the antenna selecting means, delaying a symbol of an OFDM signal received by the other antenna by a predetermined amount of time T−Tg equivalent to a difference of a symbol period T of the OFDM signal and a guard interval period Tg and outputting the delayed symbol as a second delay symbol; a first calculating means for calculating a moving average integration value (first moving average integration value: $A_I$) of the first non-delay symbol and the first delay symbol in the guard interval period Tg and calculating a moving average integration value (first moving average integration value: $B_I$) of the second non-delay symbol and the second delay symbol in the guard interval period Tg; a second calculating means for calculating a moving average integration value (second moving average integration value: $A_O$) of the first non-delay symbol and the first delay symbol in an effective symbol period Tu subsequent to the guard interval period Tg and calculating a moving average integration value (second moving average integration value: $B_O$) of the second non-delay symbol and the second delay symbol in an effective symbol period Tu subsequent to the guard interval period Tg; and a judging means for judging which C/N ratio of the two antennas selected by the antenna selecting means is favorable based on the two first moving average integration values ($A_I$ and $B_I$) and the two second moving average integration values ($A_O$ and $B_O$).

In accordance with another aspect of the present invention, there is provided an Orthogonal Frequency Division Multiplexing (OFDM) reception method comprising: an antenna selecting process for sequentially selecting at least two antennas; a non-delay symbol outputting process for, when one antenna is selected by the antenna selecting process, outputting a symbol of an OFDM signal received by the one antenna as a first non-delay symbol and, when another antenna is selected by the antenna selecting process, outputting a symbol of an OFDM signal received by the other antenna as a second non-delay symbol; a delay symbol outputting process for, when one antenna is selected by the antenna selecting process, delaying a symbol of an OFDM signal received by the one antenna by a predetermined amount of time T−Tg equivalent to a difference of a symbol period T of the OFDM signal and a guard interval period Tg and outputting the delayed symbol as a first delay symbol and, when another antenna is selected by the antenna selecting process, delaying a symbol of an OFDM signal received by the other antenna by a predetermined amount of time T−Tg equivalent to a difference of a symbol period T of the OFDM signal and a guard interval period Tg and outputting the delayed symbol as a second delay symbol; a first calculating process for calculating a moving average integration value (first moving average integration value: $A_I$) of the first non-delay symbol and the first delay symbol in the guard interval period Tg and calculating a moving average integration value (first moving average integration value: $B_I$) of the second non-delay symbol and the second delay symbol in the guard interval period Tg; a second calculating process for calculating a moving average integration value (second moving average integration value: $A_O$) of the first non-delay symbol and the first delay symbol in an effective symbol period Tu subsequent to the guard interval period Tg and calculating a moving average integration value (second moving average integration value: $B_O$) of the second non-delay symbol and the second delay symbol in an effective symbol period Tu subsequent to the guard interval period Tg; and a judging process for judging which C/N ratio of the two antennas selected by the antenna selecting process is favorable based on the two first moving average integration values ($A_I$ and $B_I$) and the two second moving average integration values ($A_O$ and $B_O$).

In accordance with another aspect of the present invention, there is provided a terrestrial digital receiver for receiving and demodulating an Orthogonal Frequency Division Multiplexing (OFDM) signal of a terrestrial digital broadcasting and decoding the OFDM signal, the terrestrial digital receiver comprising: an antenna selecting means for sequentially selecting at least two antennas; a non-delay symbol outputting means for, when one antenna is selected by the antenna selecting means, outputting a symbol of an OFDM signal received by the one antenna as a first non-delay symbol and, when another antenna is selected by the antenna selecting means, outputting a symbol of an OFDM signal received by the other antenna as a second non-delay symbol; a delay symbol outputting means for, when one antenna is selected by the antenna selecting means, delaying a symbol of an OFDM signal received by the one antenna by a predetermined amount of time T−Tg equivalent to a difference of a symbol period T of the OFDM signal and a guard interval period Tg and outputting the delayed symbol as a first delay symbol and, when another antenna is selected by the antenna selecting means, delaying a symbol of an OFDM signal received by the other antenna by a predetermined amount of time T−Tg equivalent to a difference of a symbol period T of the OFDM signal and a guard interval period Tg and outputting the delayed symbol as a second delay symbol; a first calculating means for calculating a moving average integration value (first moving average integration value: $A_I$) of the first non-delay symbol and the first delay symbol in the guard interval period Tg and calculating a moving average integration value (first moving average integration value: $B_I$) of the second non-delay symbol and the second delay symbol in the guard interval period Tg; a second calculating means for calculating a moving average integration value (second moving average integration value: $A_O$) of the first non-delay symbol and the first delay symbol in an effective symbol period Tu subsequent to the guard interval period Tg and calculating a moving average integration value (second moving average integration value: $B_O$) of the second non-delay symbol and the second delay symbol in an effective symbol period Tu subsequent to the guard interval period Tg; and a judging means for judging which C/N ratio of the two antennas selected by the antenna selecting means is favorable based on the two first moving average integration values ($A_I$ and $B_I$) and the two second moving average integration values ($A_O$ and $B_O$).

In accordance with another aspect of the present invention, there is provided an Orthogonal Frequency Division Multiplexing (OFDM) receiver comprising: a plurality of antenna connection terminals to which an antenna can be connected; an antenna switching means for selecting one antenna connection terminal from among the plurality of antenna connection terminals and switching an antenna receiving an OFDM signal; a symbol synchronization generating means for generating a symbol synchronization signal that is synchronous with a symbol, based on a correlation value of an OFDM signal received by an antenna connected to the antenna connection terminal and a signal that is the OFDM signal delayed by an effective symbol period; a synchronous clock generating means for generating a synchronous clock signal that is synchronous with a guard interval period and an effective symbol period from the symbol synchronization signal generated by the symbol synchronization generating means; a frame number generating means for generating a frame number corresponding with each frame of the OFDM signal from the OFDM signal received by the antenna connected to the antenna connection terminal; a storing means for storing a predetermined frame number; a judging means for comparing the frame number generated by the frame number generating means and the value stored in the storing means and judging whether the frame number and the value match; a first integrating means for, when judged by the judging means that the frame number generated by the frame number generating means and the value stored in the storing means match, sampling the symbol synchronization signal generated by the symbol synchronization generating means with a synchronous clock that is synchronous to the guard interval period generated by the synchronous clock generating means and determining a first integration value; a second integrating means for sampling the symbol synchronization signal generated by the symbol synchronization generating means with a synchronous clock that is synchronous to the effective symbol period generated by the synchronous clock generating means and determining a second integration value; a third integrating means for sampling the symbol synchronization signal generated by the symbol synchronization generating means after the antenna is switched by the antenna switching means with a synchronous clock that is synchronous to the guard interval period generated by the synchronous clock generating means and determining a third integration value; a fourth integrating means for sampling the symbol synchronization signal generated by the symbol synchronization generating means with a synchronous clock that is synchronous to the effective symbol period generated by the synchronous clock generating means and determining a fourth integration value; and an antenna switch judging means for judging whether to switch the antenna based on the first to fourth integration value determined by the first to fourth integrating means; wherein, when judged by the antenna switch judging means that the antenna is switched, the antenna switching means switches the antenna at a timing synchronous with the symbol synchronization signal generated by the symbol synchronization means.

In accordance with another aspect of the present invention, there is provided a Orthogonal Frequency Division Multiplexing (OFDM) reception method comprising: an antenna switching process for selecting one antenna connection terminal from among the plurality of antenna connection terminals and switching an antenna receiving an OFDM signal; a symbol synchronization generating process for generating a symbol synchronization signal that is synchronous with a symbol, based on a correlation value of an OFDM signal received by an antenna connected to the antenna connection terminal and a signal that is the OFDM signal delayed by an effective symbol period; a synchronous clock generating process for generating a synchronous clock signal that is synchronous with a guard interval period and an effective symbol period from the symbol synchronization signal generated by the symbol synchronization generating process; a frame number generating process for generating a frame number corresponding with each frame of the OFDM signal from the OFDM signal received by the antenna connected to the antenna connection terminal; a storing process for storing a predetermined frame number; a judging process for comparing the frame number generated by the frame number generating process and the value stored in the storing process and judging whether the frame number and the value match; a first integrating process for, when judged by the judging process that the frame number generated by the frame number generating process and the value stored in the storing process match, sampling the symbol synchronization signal generated by the symbol synchronization generating process with a synchronous clock that is synchronous to the guard interval period generated by the synchronous clock generating process and determining a first integration value; a second integrating process for sampling the symbol synchronization signal generated by the symbol synchronization generating process with a synchronous clock that is synchronous to the effective symbol period generated by the synchronous clock generating process and determining a second integration value; a third integrating process for sampling the symbol synchronization signal generated by the symbol synchronization generating process after the antenna is switched by the antenna switching process with a synchronous clock that is synchronous to the guard interval period generated by the synchronous clock generating process and determining a third integration value: a fourth integrating process for sampling the symbol synchronization signal generated by the symbol synchronization generating process with a synchronous clock that is synchronous to the effective symbol period generated by the synchronous clock generating process and determining a fourth integration value; and an antenna switch judging process for judging whether to switch the antenna based on the first to fourth integration value determined by the first to fourth integrating process; wherein, when judged by the antenna switch judging process that the antenna is switched, the antenna switching process switches the antenna at a timing synchronous with the symbol synchronization signal generated by the symbol synchronization process.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the present invention will hereinafter be described in detail with reference to the accompanying drawings, as applied to an OFDM receiver for terrestrial digital broadcasting. In the following explanation, various specific details or examples, numerical values, character strings, and other illustrative notations are intended as reference for clarifying the concept of the present invention. Accordingly, the concept of the invention as a whole or in part is not limited thereto. Detailed explanations of well-known techniques, well-known architectures, and well-known circuit configurations (hereinafter, referred to as "common knowledge") are avoided to simplify the explanations. These items of common knowledge as a whole or in part are not intentionally excluded. Such common knowledge can be recognized by a person skilled in the art at the time the present invention has been filed and, therefore, is included in the following explanations.

Figure 1:
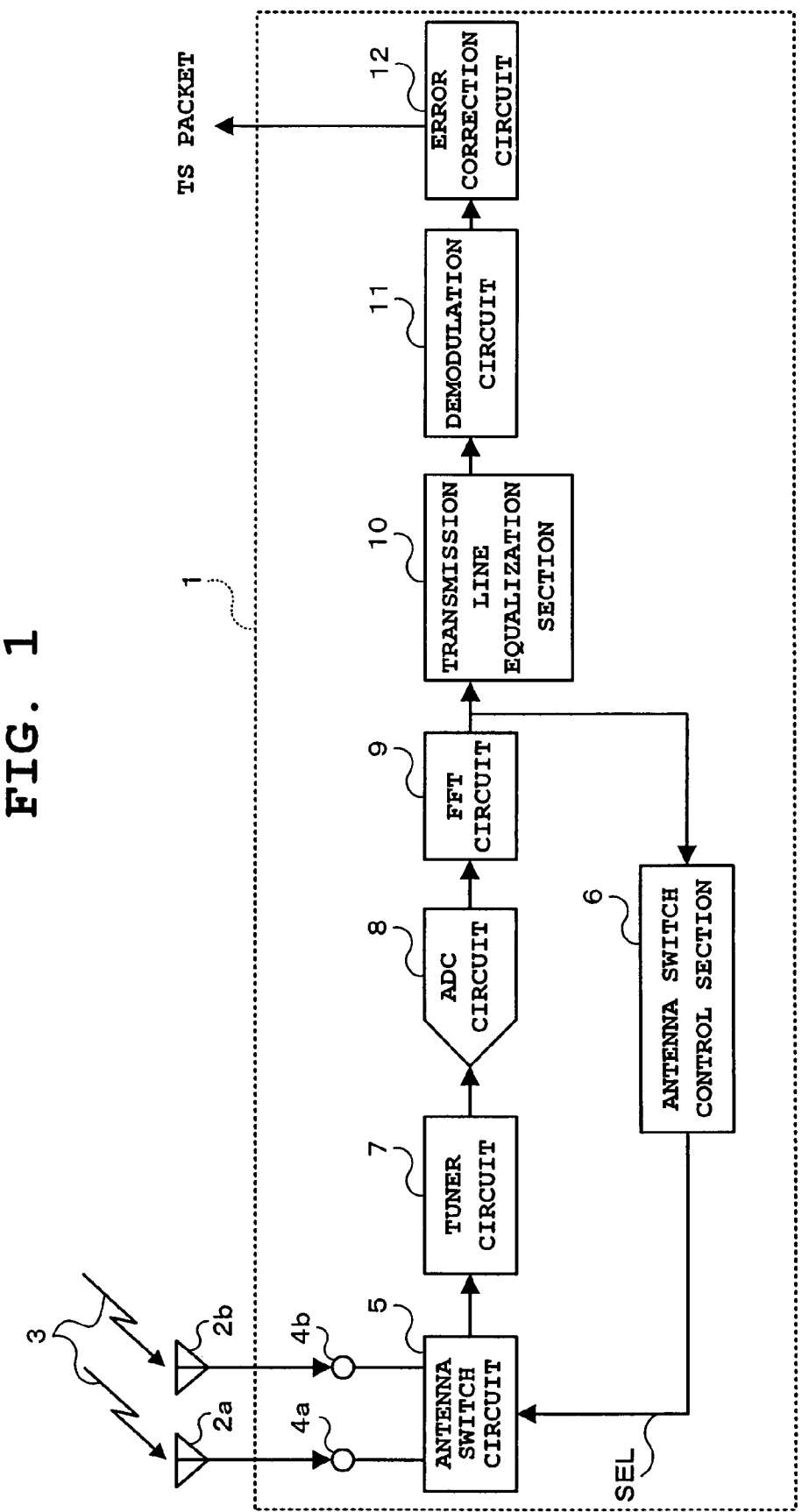
FIG. 1 is a block diagram of an OFDM receiver.

FIG. 1 is a block diagram of the orthogonal frequency division multiplexing (OFDM) receiver. The configuration in FIG. 1 shows respective blocks for reception, demodulation, and error correction of a terrestrial digital broadcast wave. Sections for expanding reception data after error correction (MPEG transport stream packet [TS packet]) in MPEG format and outputting the expanded reception data to a display unit are omitted.

In FIG. 1, an OFDM receiver 1 includes a plurality of antenna terminals 4a, 4b, etc. to which reception signals (terrestrial digital broadcast waves 3) from a plurality of terrestrial digital broadcast receiving antennas 2a, 2b, etc. (hereinafter, referred to as simply "antennas") are respectively inputted. The terrestrial digital broadcast receiving antennas 2a, 2b, etc. are placed in positions that are spatially misaligned. According to the present embodiment, the number of antennas is "2", for sake of convenience. However, the number of antennas is not limited thereto. The number of antennas is merely required to be at least "2". "3" or larger numbers is not excluded.

The plurality of antenna terminals 4a and 4b are connected to an antenna switch circuit 5. The antenna switch circuit 5 selects one of the antenna terminals 4a and 4b depending on an antenna switch control signal SEL from an antenna switch control section 6. The antenna switch circuit 5 outputs a reception signal from the selected antenna terminal to a tuner circuit 7.

The tuner circuit 7 selects a terrestrial digital broadcasting channel. In addition, the tuner circuit 7 converts a reception signal (a high frequency signal in the 500 MHz band) of the selected channel to an intermediate frequency (IF) signal in an intermediate frequency band (500 KHz band) that facilitates processing in subsequent circuits and outputs the converted signal to an analog-to-digital conversion (ADC) circuit 8. The ADC circuit 8 converts an analog IF signal to a digital signal and outputs the converted signal to a fast Fourier transform (FFT) circuit 9. Details of the FFT circuit 9 and the subsequent circuits will be described with reference to the following FIG. 2.

Figure 2:
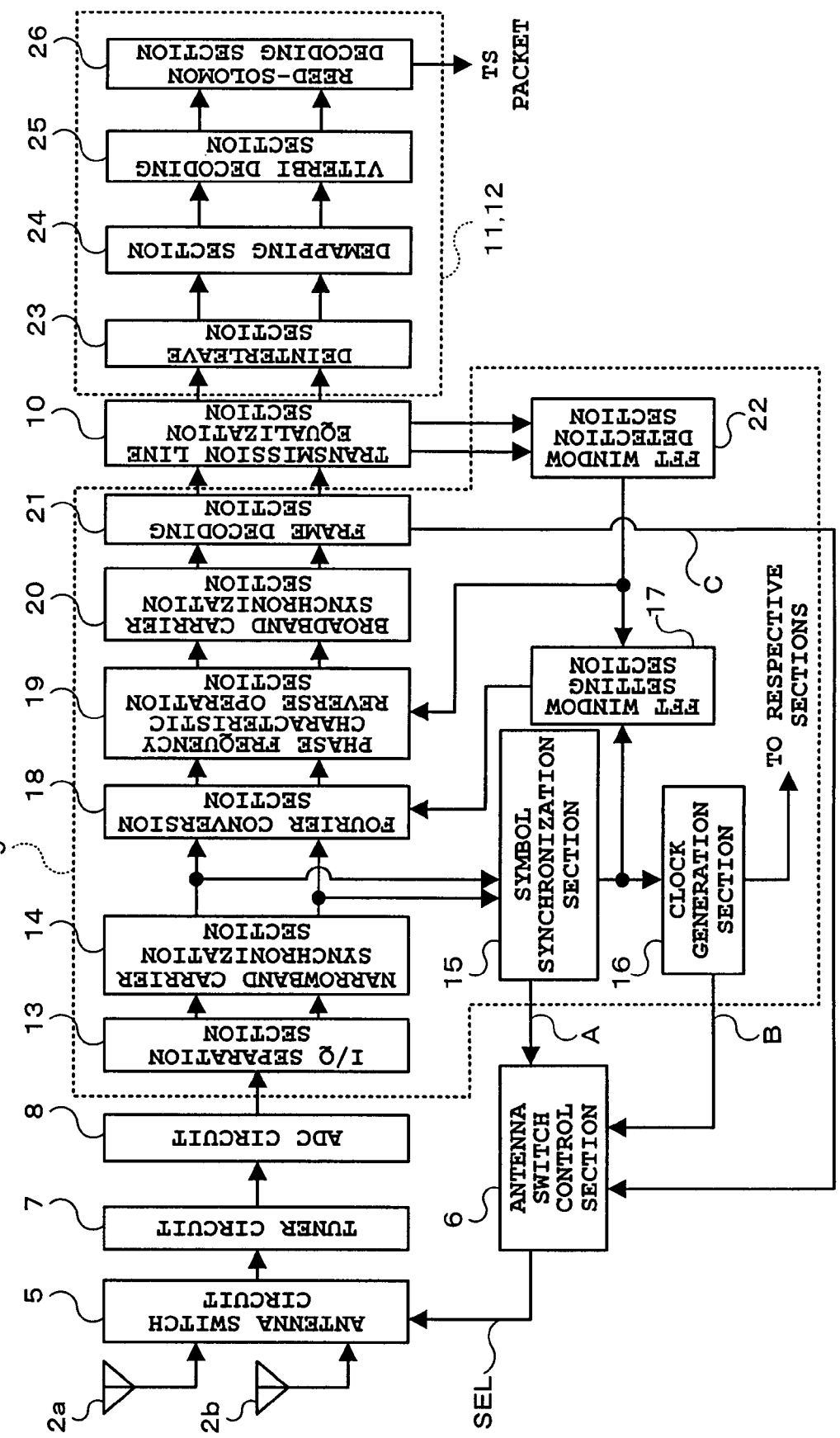
FIG. 2 is a detailed block diagram of the OFDM receiver shown in FIG. 1.

FIG. 2 is a detailed block diagram of the OFDM receiver shown in FIG. 1. In FIG. 2, the FFT circuit 9 includes an I/Q separation section 13, a narrowband carrier synchronization section 14, a symbol synchronization section 15, a clock generation section 16, an FFT window setting section 17, a Fourier transform section 18, a phase frequency characteristic reverse operation section 19, a broadband carrier synchronization section 20, and a frame decoding section 21. A demodulation circuit 11 and an error correction circuit 12 include a deinterleave section 23, a demapping section 24, a Viterbi decoding section 25, and a Reed-Solomon decoding section 26. The demodulation circuit 11 and the error correction circuit 12 are shown in the same block for sake of simplicity in the explanation.

After being converted to a digital signal in the ADC circuit 8, the OFDM signal is divided by the I/Q separation section 13 into an in-phase signal (signal I) and an orthogonal signal (signal Q). The orthogonal signal (signal Q) has a phase that differs by 90 degrees from the in-phase signal (signal I). Both signals are converted to complex OFDM signals.

Figure 8A:
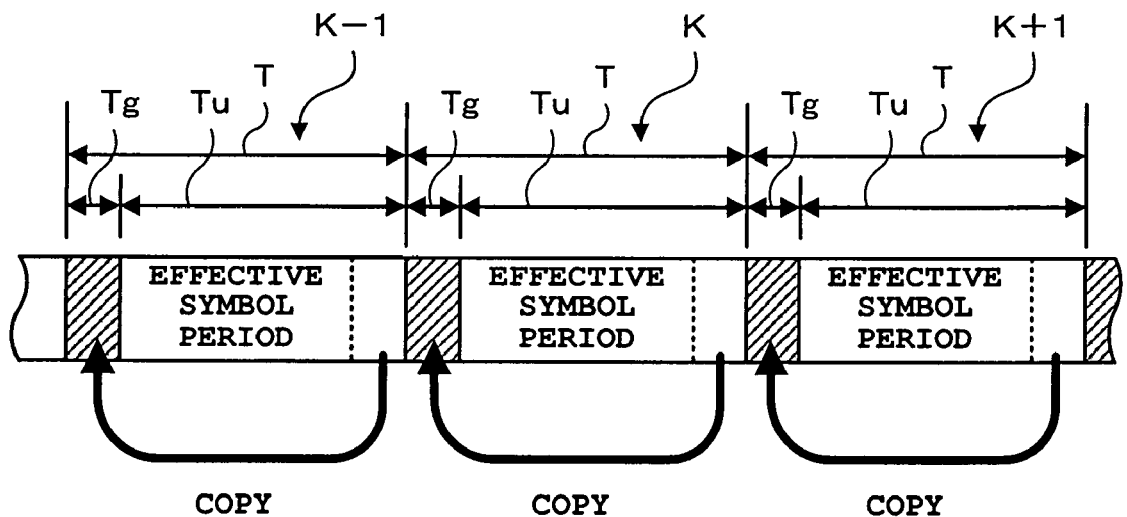
FIG. 8A is a conceptual diagram of a guard interval in the conventional prior art.
Figure 8B:
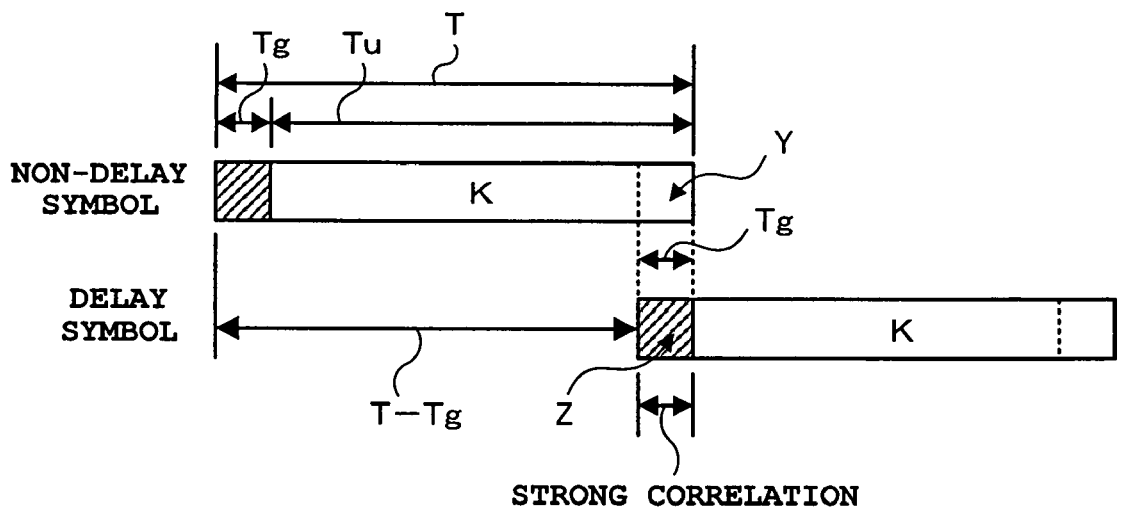
FIG. 8B is a conceptual diagram of a use of guard interval information in the conventional prior art.

The complex OFDM signal is sequentially segmented for each transmission symbol period, with the transmission symbol period as one unit. As previously explained with reference to FIG. 8, a transmission symbol period T includes a guard interval period Tg and a subsequent effective symbol period Tu. One unit of an IFFT signal is assigned to the effective symbol period Tu. The one unit of the IFFT signal is generated by an Inverse Fourier Transform (IFFT) process being performed on transmission data at the transmission end. In addition, 1/n (n=4, 8, etc.) portion of the rear end of the subsequent effective symbol period Tu is inserted into the guard interval period Tg as is.

The complex OFDM signal from the I/Q separation section 13 is inputted into the narrowband carrier synchronization section 14. The narrowband carrier synchronization section 14 corrects frequency distortion. The correction is performed so that the frequency of each sub-carrier after a fast Fourier transformation by the Fourier transform section 18, described hereafter, becomes an integral multiple of a predetermined frequency (0.992 KHz in Mode 3 of the terrestrial digital broadcasting).

The frequency distortion in the complex OFDM signal is detected based on the size of correlation in the symbol synchronization section 15. The narrowband carrier synchronization section 14 receives feedback (detected frequency distortion) from the symbol synchronization section 15 and corrects the frequency distortion. In other words, frequency distortion in the complex OFDM signal is detected based on a difference in the respective correlation values of the in-phase signal (signal I) and the orthogonal signal (signal Q), at a position at which the correlation is the largest in the symbol synchronization section 15.

A detailed method for correcting frequency distortion in the complex OFDM signal is as follows. A narrowband carrier frequency error with an accuracy equal to or less than ±½ of the frequency interval of the sub-carrier (for example, 0.992 KHz) is calculated. Based on the narrowband carrier frequency error, a frequency generator generates a signal corresponding to the error. The signal is complex-multiplied with the complex OFDM signal.

The complex OFDM signals of which the frequency distortion has been corrected as described above are respectively inputted into the symbol synchronization section 15 and the Fourier transform section 18.

The symbol synchronization section 15 utilizes the fact that the guard interval period Tg in the complex OFDM signal is a copy of a portion of the effective symbol period Tu and determines the correlation between an output signal from the narrowband carrier synchronization section 14 and a signal that is the output signal delayed by an amount of time roughly equivalent to the effective symbol period Tg. Next, the symbol synchronization section 15 sets a position at which the sum of the correlation value of the in-phase signal (signal I) and the correlation value of the orthogonal signal (signal Q) is the largest as a start timing of the effective symbol period Tu. Then, the symbol synchronization section 15 generates a symbol synchronization pulse at the start timing and outputs the pulse to the clock generation section 16 and the Fourier transform section 18.

The clock generation section 16 generates a synchronous clock corresponding to the symbol synchronization pulse from the symbol synchronization section 15 and supplies the synchronous clock to each section (the Fourier transform section 18, the phase frequency characteristic reverse operation section 19, the broadband carrier synchronization section 20, and the like).

The Fourier transform section 18 performs a FFT (Fourier transform) process on the complex OFDM signal of which the frequency distortion has been corrected by the narrowband carrier synchronization section 14, based on the pulse outputted from the FFT window setting section 17. As a result, the Fourier transform section 18 demodulates the N series (432 channels in Mode 3 of terrestrial digital broadcasting) complex OFDM signals that have been orthogonal frequency division multiplexed on each sub-carrier band at the transmission end.

The FFT window setting section 17 changes the generation timing of the symbol synchronization pulse to be outputted from the symbol synchronization section 15, based on a window position correction value obtained from a FFT window position detection section 22, described hereafter. As a result, the FFT window setting section 17 adjusts the FFT window position.

The Fourier transform section 18 performs the FFT process on the complex OFDM signal, based on the changed symbol synchronization pulse. In other words, the Fourier transform section 18 sets a time window (FFT window) based on a window setting pulse. The starting position of the time window is the head of the effective symbol period. The time window has a time width of the effective symbol period. Next, Fourier transform section 18 performs the FFT process on the complex OFDM signal for a period corresponding to the FFT window and demodulates the N series complex OFDM signal.

The phase frequency characteristic reverse operation section 19 multiplies a complex data string of FFT-processed complex OFDM signals with a phase rotation amount corresponding to the window position correction value obtained from the FFT window position detection section 22.

The broadband carrier synchronization process section 20 corrects a frequency shift between the N series complex OFDM demodulated by the FFT process and the sub-carrier band so that the demodulated N series complex OFDM signal is correctly positioned in the frequency band of the corresponding sub-carrier. Specifically, the broadband carrier synchronization process section 20 detects a pilot signal assigned in advance to a particular sub-carrier at the transmission end, among the demodulated complex OFDM signals. Then, the broadband carrier synchronization process section 20 detects a shift between the sub-carrier band from which the pilot signal has been detected and the sub-carrier band to which the pilot signal is assigned at the transmission end. As a result, the broadband carrier synchronization process section 20 determines the frequency shift between the demodulated N series complex OFDM signal and the sub-carrier band. Then, the broadband carrier synchronization process section 20 shifts the frequency band of the complex OFDM signal by the amount corresponding to the frequency shift.

The pilot signal described above refers to a signal which is inserted in advance into carrier bands at a constant interval (n, 2n, 3n...; n=12 in terrestrial digital broadcasting), among the N series carrier bands, at the transmission end. The pilot signal is also referred to as a scattered pilot (SP) signal.

The frame decoding section 21 judges a synchronization bit of a transmission control signal (TMCC) in the complex OFDM signal and synchronizes the frames of the OFDM signals. In addition, the frame decoding section 21 accumulates an amount of demodulated N series complex OFDM signals corresponding to a predetermined number of symbols and constructs a single OFDM frame. The frame decoding section 21 also extracts the TMCC assigned to a predetermined series (sub-carrier band) within the OFDM frame.

The transmission line equalization section 10 corrects signal distortion that has occurred in the transmission line. In other words, the transmission line equalization section 10 detects a shift and a size of the shift occurring at an ideal point between the in-phase signal (signal I) and the orthogonal signal (signal Q) forming the complex OFDM signal, caused by influence from ghost waves, shifting of the FFT window position, and the like. The transmission line equalization section 10 corrects the shift.

In other words, the transmission line equalization section 10 estimates the phase shift from the ideal point between the in-phase signal (signal I) and the orthogonal signal (signal Q) generated in the pilot signal, described above, and performs an equalization process on the in-phase signal (signal I) and the orthogonal signal (signal Q) so as to cancel the estimated phase shift. In addition, the transmission line equalization section 10 adjusts the amplitude levels of the in-phase signal (signal I) and the orthogonal signal (signal Q) on each carrier band based on the amplitude level of the pilot signal and provides the extracted pilot signal to the FFT window position detection section 22.

The FFT window position detection section 22 uses the pilot signal extracted by the transmission line equalization section 10 (or the transmission line characteristic estimated by the transmission line equalization section 10) and detects the shift between the current FFT window position and the effective symbol periods of a regular transmission wave and other ghosts wave.

Furthermore, the FFT window position detection section 22 judges whether a preceding ghost wave exceeding a predetermined threshold is included in a reception wave. If the preceding ghost wave exceeding the threshold is included, the FFT window position detection section 22 calculates a correction amount of the FFT window position, based on the shift amount between the effective symbol period of the preceding ghost wave and the FFT window position.

The deinterleave section 23 cancels (restores to original sorting) interleave in the frequency direction (sorting between data series) and interleave in the time axis direction (sorting of data in the time axis direction within each data series) performed at the transmission end.

The demapping section 24 decodes data placed depending on the modulation method. The Viterbi decoding section 25 decodes data that have been convolutionally encoded at the transmission end. The Reed-Solomon decoding section 26 decodes data that have been Reed-Solomon encoded at the transmission end. The Reed-Solomon decoding section 26 generates a transport streams packet (TS packet) in the MPEG format and outputs the TS packet to a display unit (not shown) via an MPEG decoder (not shown).

Figure 3:
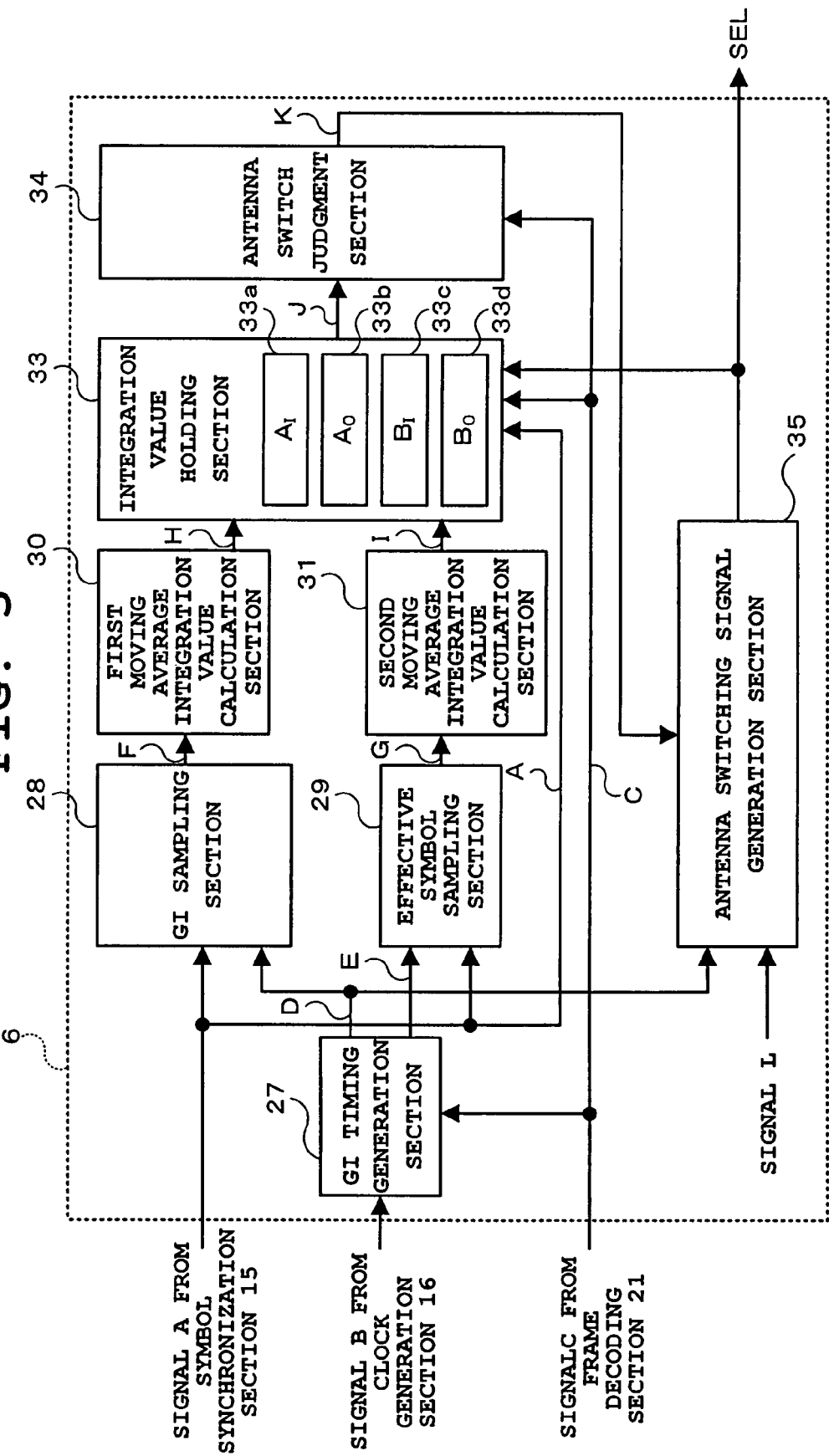
FIG. 3 is a block diagram of an antenna switch control section 6.

FIG. 3 is a block diagram of the antenna switch control section 6. In FIG. 3, the antenna switch control section 6 includes a GI timing generation section 27, a GI sampling section 28, an effective symbol sampling section 29, a first moving average integration value calculation section 30, a second moving average integration value calculation section 31, an integration value holding section 33, an antenna switch judgment section 24, and an antenna switching signal generation section 35. "GI" is the abbreviation of "guard interval".

A signal B (clock counter and clock signal) from the clock generation section 16 and a signal C (frame number) from the frame decoding section 21 are inputted into the GI timing generation section 27. When judged that a frame number stored in advance and the signal C (frame number) match, the GI timing generation section 27 generates a signal D (GI timing signal) and a signal E (effective symbol timing signal) based on the signal B (clock counter and clock signal) and the signal C (frame number).

A signal A (symbol synchronizing pulse) from the symbol synchronization section 15 and the signal D (GI timing signal) from the GI timing generation section 27 are inputted into the GI sampling section 28. The GI sampling section 28 samples the information in the guard interval period based on the signal A (symbol synchronizing pulse) and the signal D (GI timing signal) and outputs the sampled information as a signal F.

The signal A (symbol synchronizing pulse) from the symbol synchronization section 15 and the signal E (effective symbol timing signal) from the GI timing generation section 27 are inputted into the effective symbol sampling section 29. The effective symbol sampling section 29 samples the information in the effective symbol period based on the signal A (symbol synchronizing pulse) and the signal E (effective symbol timing signal), and outputs the sampled information as a signal G.

The signal F (information in the guard interval period) from the GI sampling section 28 is inputted into the first moving average integration value calculation section 30. The first moving average integration value calculation section 30 determines an integration value by moving-averaging the information in the guard interval period for a predetermined period of time (integration period within guard interval Sa, described hereafter) and outputs the integration value as a signal H (first moving average integration value).

The signal G (information in the effective symbol period) from the effective symbol sampling section 29 is inputted into the second moving average integration value calculation section 31. The second moving average integration value calculation section 31 determines an integration value by moving-averaging the information in the effective symbol period for a predetermined period of time (integration period outside of guard interval Sb, described hereafter), and outputs the integration value as a signal I (second moving average integration value).

The signal H (first moving average integration value) from the first moving average integration value calculation section 30 and the signal I (second moving average integration value) from the second moving average integration value calculation section 31 are inputted into the integration value holding section 33. The integration value holding section 33 assigns the signal H and the signal I to four memories 33a to 33d and temporarily holds the signals.

The four memories 33a to 33d are respectively referred to as a first memory 33a, a second memory 33b, a third memory 33c, and a fourth memory 33d. Symbols ($A_I$, $A_O$, $B_I$, and $B_O$) stated within each memory indicate the signal H (first moving average integration value) inputted from the first moving average integration value calculation section 30 and the signal I (second moving average integration value) inputted from the second moving average integration value calculation section 31. $A_I$ and $B_I$ are both signal H (first moving average integration value). $A_O$ and $B_O$ are both signal I (second moving average integration value).

The inferior character (I) in $A_I$ and $B_I$ indicates the integration period within the guard interval Sa, described hereafter (in other words, an abbreviation of IN, indicating "within" the guard interval). The inferior character (O) in $A_O$ and $B_O$ indicates the integration period outside of the guard interval Sa, described hereafter (in other words, an abbreviation of OUT, indicating "outside" of the guard interval). The prefixes A and B indicate a distinction between the reception antennas of the data used in the integration value calculations. In other words, A refers to "antenna A" and B refers to "antenna B". To be precise, A indicates an antenna 2a connected to an antenna terminal 4a. B indicates an antenna 2b connected to an antenna terminal 4b. However, here, the antennas are merely referred to as "antenna A" and "antenna B" for sake of simplicity.

Signals J (four integration values $A_I$, $A_O$, $B_I$, and $B_O$) from the integration value holding section 33 and the signal C (frame number) from the frame decoding section 21 are inputted into the antenna switch judgment section 24. The antenna switch judgment section 24 judges which C/N ratio of the antenna A or the antenna B is favorable by comparing the four integration values $A_I$, $A_O$, $B_I$, and $B_O$ from the integration value holding section 33, according to the frame number. The antenna switch judgment section 24 outputs a signal K (signal prompting the selection of the antenna with the favorable C/N ratio) indicating the judgment result to the antenna switching signal generating section 35.

The signal D (GI timing signal) from the GI timing generating section 27 and the signal K (signal prompting the selection of the antenna with the favorable C/N ratio) from the antenna switch judgment section 24 are inputted into the antenna switching signal generation section 35. In addition, a signal L instructing a start of an antenna selection operation when the power of the OFDM receiver 1 is turned on, when the channel is selected, or at an arbitrary time specified by the user is inputted into the antenna switching signal generation section 35.

In response to the input of the signal L, the antenna switching signal generation section 35 outputs a signal (antenna switch control signal SEL) for sequentially selecting the antenna A and the antenna B to the antenna switch circuit 5. Specifically, in response to the input of the signal L, the antenna switching signal generation section 35 first outputs the antenna switch control signal SEL for instructing a selection of an initial antenna (here, "antenna A" for sake of simplicity) to the antenna switch circuit 5. Then, after the antenna A receives one symbol of the OFDM signal, the antenna switching signal generation section 35 outputs the antenna switch control signal SEL for instructing a selection of the "antenna B" to the antenna switch circuit 5. Subsequently, in accordance to the signal K from the antenna switch judgment section 24, the antenna switching signal generation section 35 outputs the antenna switch control signal SEL for instructing the selection of the antenna having the favorable C/N ratio (antenna A or antenna B depending on the circumstances at this time) to the antenna switch circuit 5.

The output timing of the antenna switch control signal SEL is required to be an appropriate timing that does not cause an interruption in the reception symbol. The antenna switching signal generation section 35 outputs the antenna switch control signal SEL within the guard interval period (preferably a timing that is as close to the start of the guard interval period as possible), in accordance to the signal D (GI timing signal) from the GI timing generation section 27.

As described above, a function of the antenna switch control section 6 is to integrate the correlation values used by the symbol synchronization section 15, separately for the correlation value of the guard interval period and for correlation value of the other period, by utilizing the symbol synchronization timing of the symbol synchronization section 15, based on the information on transmission control signal (TMCC) mode and the guard interval length obtained from the frame decoding section 21.

Figure 4:
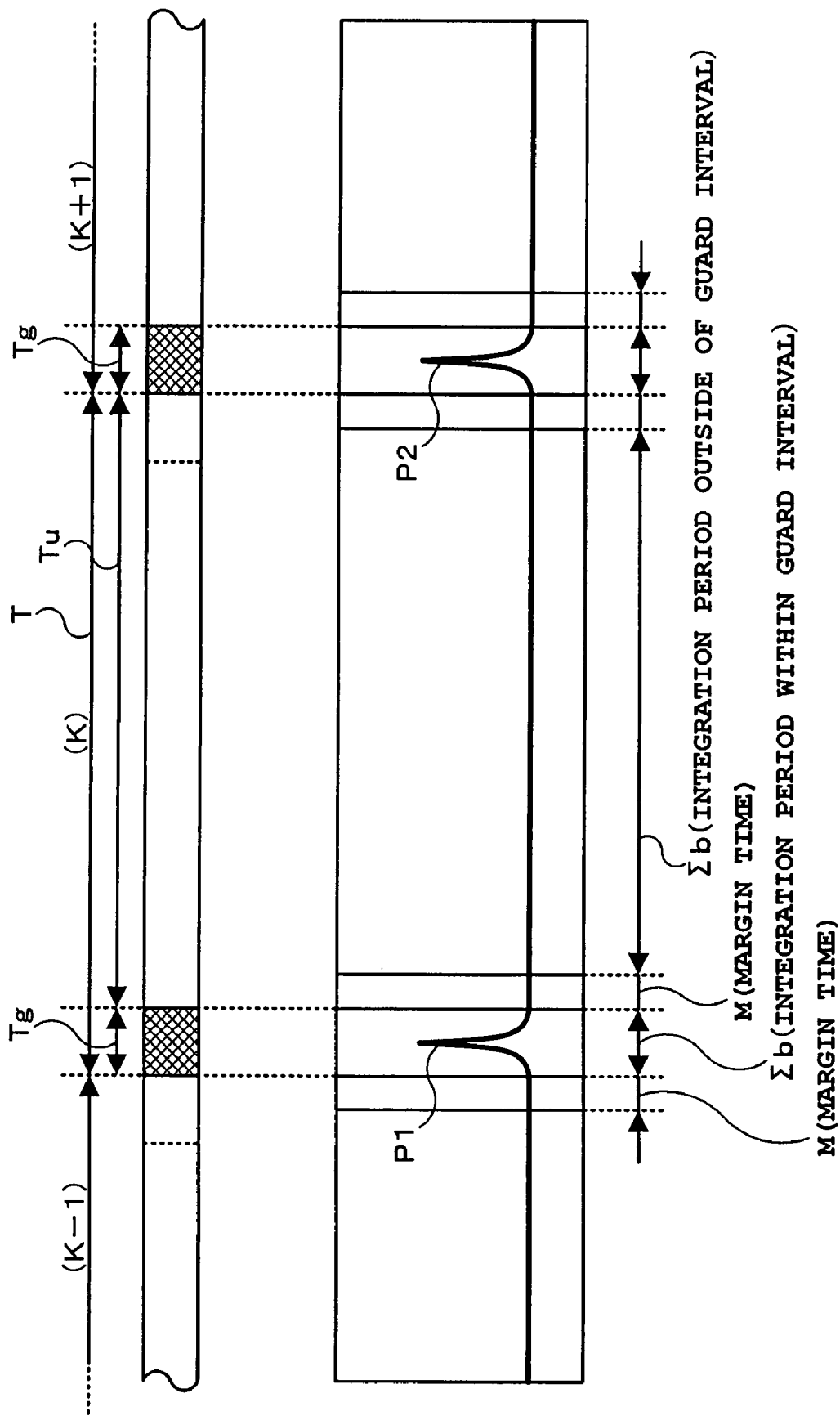
FIG. 4 is an explanatory diagram of an integration period.

FIG. 4 is an explanatory diagram of the integration period. According to the present embodiment, two integration periods, such as those shown in FIG. 4, are specified. The first integration period is the "integration period within guard interval Sa". The second integration period is the "integration period outside of guard interval Sb".

The integration period within guard interval Sa is the same period as the guard interval period Tg of the symbol. The integration period outside of guard interval Sb refers to the period other than the integration period within guard interval Sa and a period that is the effective symbol period Tu from which a certain margin period M is removed. The margin period M is an allowance period used to eliminate the effects of the multipath. In other words, depending on the effects of the multipath, the guard interval period Tg may be slightly temporally advanced or delayed and may be inserted into the head or the end of the effective symbol period Tu. Therefore, the margin period M is provided to eliminate this effect.

The antenna switch control section 6 calculates the correlation values (first moving average integration value and second moving average integration value) for the antenna A and the antenna $B_I$ according to the two specified integration periods Sa and Sb. In other words, the antenna switch control section 6 calculates the first moving average integration value $(A_I)$ and the second moving average integration value $(A_O)$ of the OFDM signal received by the antenna A. The antenna switch control section 6 also calculates the first moving average integration value $(B_I)$ and the second moving average integration value $(B_O)$ of the OFDM signal received by the antenna B. The antenna switch control section 6 assigns the calculation results to the four memories 33a to 33d and temporarily holds the calculation results. In other words, $A_I$ is temporarily stored in the first memory 33a, $A_O$ is temporarily stored in the second memory 33b, $B_I$ is temporarily stored in the third memory 33c, and $B_O$ is temporarily stored in the fourth memory 33d.

The solid line having two peaks, P1 and P2, in FIG. 4, indicates the correlation values of the non-delay symbol and the delay symbol (non-delay signal delayed by T-Tg). The peak P1 and peak P2 sections indicating the largest correlation values respectively correspond to the guard interval period Tg. This is because the information in the guard interval period Tg matches the information at the end of the effective symbol period Tu subsequent to the guard interval period Tg.

Figure 5:
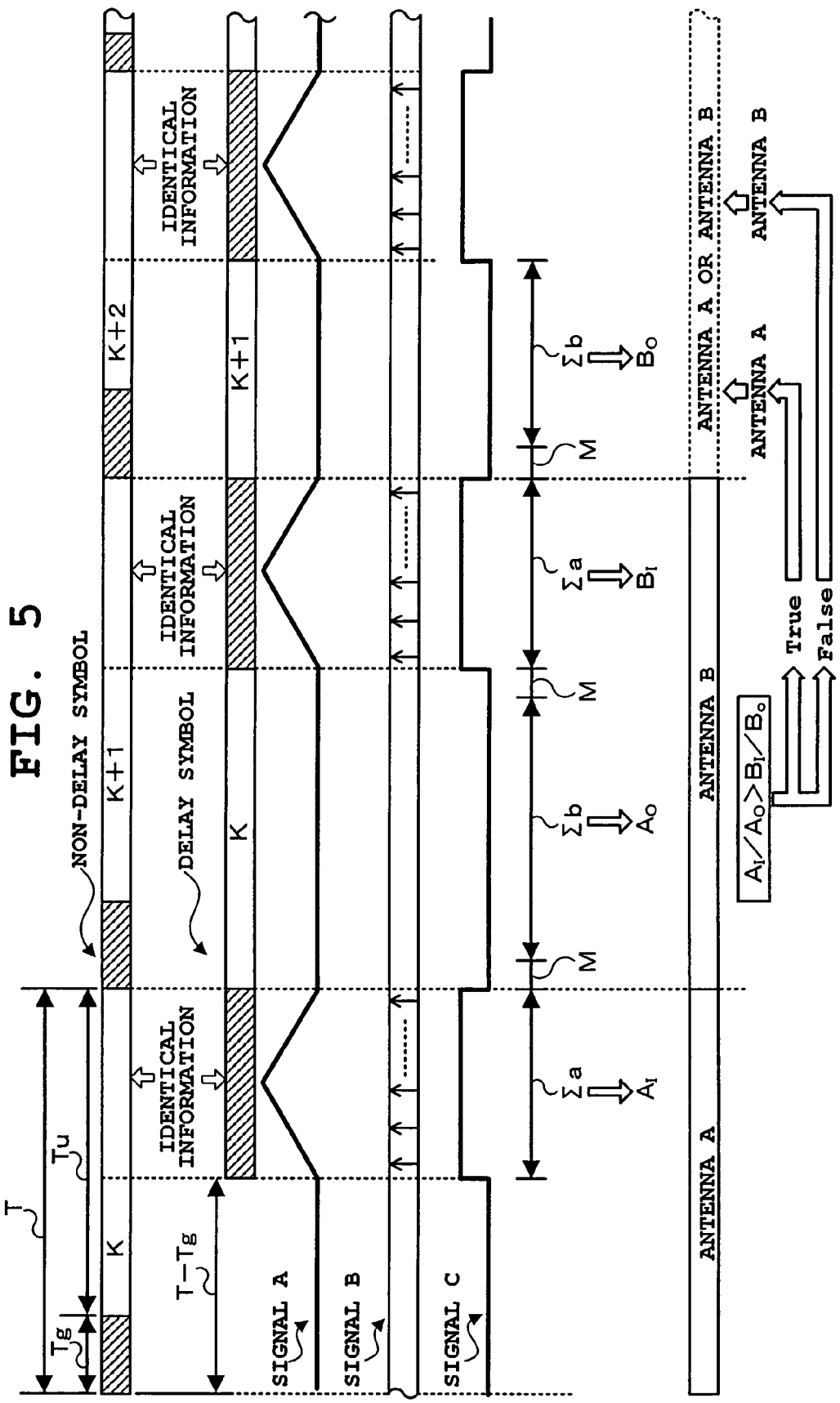
FIG. 5 is a conceptual diagram of integration.

FIG. 5 is a conceptual diagram of integration. In FIG. 5, the delay symbol is the non-delay symbol delayed by a predetermined period of time (T-Tg). The guard interval period Tg of the delay symbol and the end portion of the effective symbol period Tu of the non-delay symbol (copy source of the information in the guard interval period Tg) overlap on the time axis.

The antenna switch control section 6 calculates the respective moving average integration values ($A_O$, $A_O$, $B_I$, and $B_O$) of the two specified periods (the integration period within guard interval Sa and the integration period outside of guard interval Sb) of the two symbols (non-delay symbol and the delay symbol). The first moving average integration values ($A_I$ and $B_I$) are the moving average integration values of the integration period within guard interval Sa. The second moving average integration values ($A_O$ and $B_O$) are the moving average integration values of the integration period outside of guard interval Sb. As described earlier, $A_I$ and $A_O$ are the first moving average integration value and the second moving average integration value of the OFDM signal received using the "antenna A". $B_I$ and $B_O$ are the first moving average integration value and the second moving average integration value of the OFDM signal received using the "antenna B".

The two integration periods Sa and Sb are identified based on the signal A (symbol synchronization pulse) from the symbol synchronization section 15. The integration process is performed based on the signal B (clock counter and clock signal) from the clock generation section 16. The number of the symbol to which the integration process is performed is identified based on the signal C (frame number) from the frame decoding section 21.

The antenna switch control section 6 compares the four integration values ($A_I$, $A_O$, $B_I$, and $B_O$) and judges the antenna having the favorable C/N ratio. An example of a judgment equation (evaluation equation) is indicated by "$A_I/A_O > B_I/B_O$" in FIG. 5. When the evaluation equation is true, the antenna A is judged to have the favorable C/N ratio. When the evaluation equation is false, the antenna B is judged to have the favorable C/N ratio. The principle behind the evaluation equation will be described hereafter.

Figures 6A, 6B:
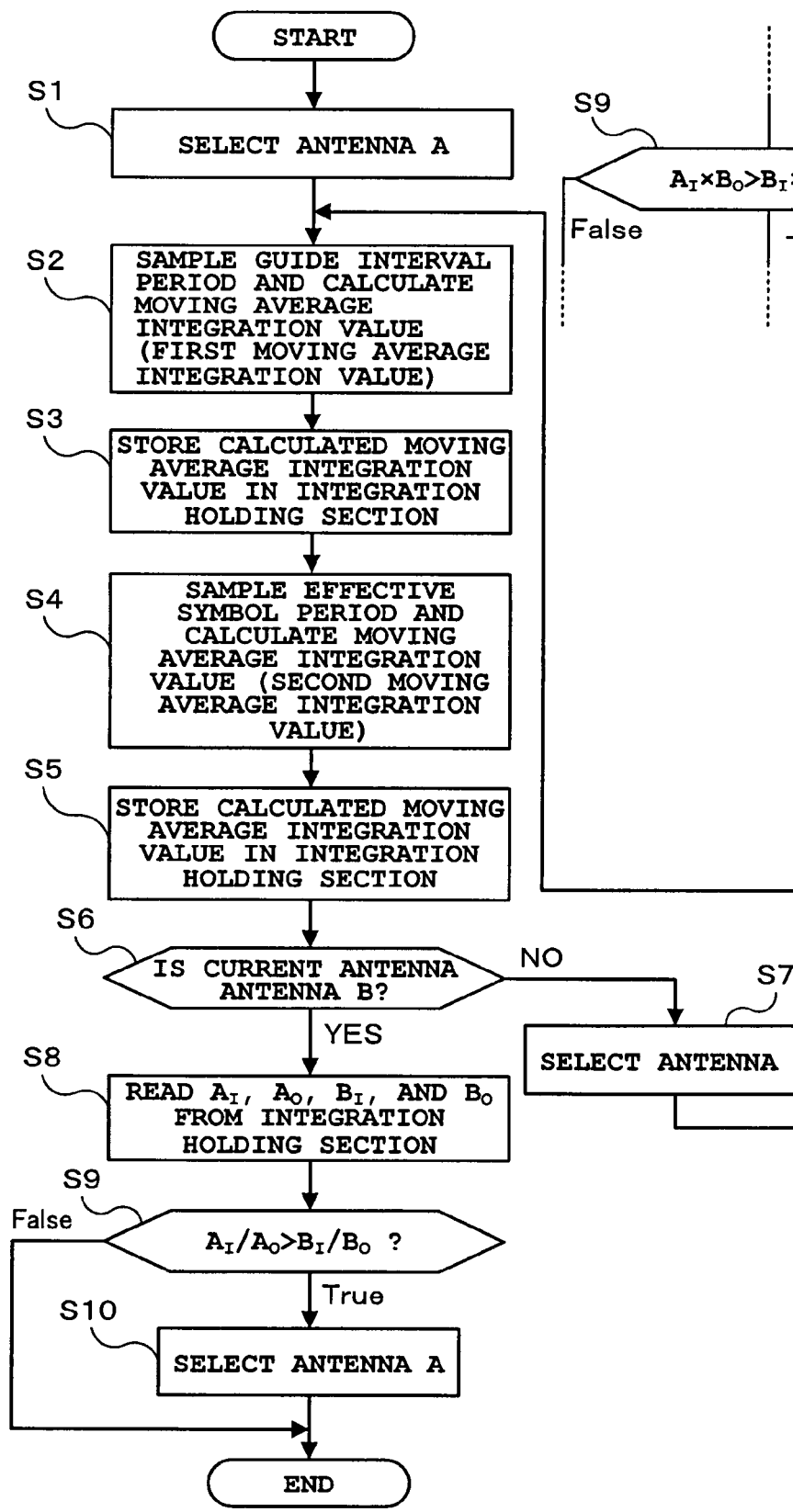
FIG. 6A is an operational flow chart of the antenna switch control section 6.
FIG. 6B is a diagram showing an example of another evaluation equation.

FIG. 6A is an operational flowchart of the antenna switch control section 6. In FIG. 6A, the antenna switch control section 6 first selects the initial antenna (here, "antenna A") (Step S1). Then, the antenna switch control section 6 performs the moving average integration process on the integration period within guard interval Sa of the OFDM signal received by the antenna A and determines the first moving average integration value ($A_I$) (Step S2). The antenna switch control section 6 temporarily holds the first moving average integration value ($A_I$) in the first memory 33a (Step S3). Next, the antenna switch control section 6 performs the moving average integration process on the integration period outside of guard interval Sb of the same OFDM signal and determines the second moving average integration value ($A_O$) (Step S4). The antenna switch control section 6 temporarily holds the second moving average integration value ($A_O$) in the second memory 33b (Step S5).

Next, the antenna switch control section 6 judges whether the current antenna is an antenna other than the initial antenna (antenna A) (Step S6). In other words, the antenna switch control section 6 judges whether the current antenna is "antenna B". At this stage, the antenna is still the initial antenna (antenna A). Therefore, the judgment result at Step S6 is "NO". The antenna switch control section 6 selects the antenna B and performs the steps subsequent to Step S2 again.

In other words, the antenna switch control section 6 performs the moving average integration process on the integration period within guard interval Sa of the OFDM signal received by the antenna B and determines the first moving average integration value ($B_I$) (Step S2). The antenna switch control section 6 temporarily holds the first moving average integration value ($B_I$) in the third memory 33c (Step S3). Next, the antenna switch control section 6 performs the moving average integration process on the integration period outside of guard interval Sb of the same OFDM signal and determines the second moving average integration value ($B_O$) (Step S4). The antenna switch control section 6 temporarily holds the second moving average integration value ($B_O$) in the fourth memory 33d (Step S5).

Next, the antenna switch control section 6 judges whether the current antenna is an antenna other than the initial antenna (antenna A) (Step S6). In other words, the antenna switch control section 6 judges whether the current antenna is "antenna B". At this stage, the antenna is "antenna B". Therefore, the judgment result at Step S6 is "YES", and the antenna switch control section 6 leaves the process loop. The antenna switch control section 6 reads the four integration values temporarily stored in the first memory 33a to fourth memory 33d of the integration value holding section 33 (Step S8) and evaluates the equation "$A_I/A_O > B_I/B_O$" (Step S9).

When the evaluation result is true, the antenna switch control section 6 judges that the antenna A has the more favorable C/N ratio and returns the antenna to the original antenna (switches from the current antenna B to the antenna A) (Step S10). The process in the flowchart is completed. At the same time, when the evaluation result is false, the antenna switch control section 6 judges that the antenna B has a more favorable C/N ratio than the antenna A. The antenna switch control section 6 completes the process in the flowchart without performing any operations (the current antenna B remains).

FIG. 6B is a diagram showing an example of another evaluation equation. In FIG. 6B, an example of another evaluation equation "$A_I \times B_O > B_I \times A_O$" that can be used in place of the evaluation equation "$A_I/A_O > B_I/B_O$" at Step S9 in FIG. 6A is shown. In the evaluation equation "$A_I/A_O > B_I/B_O$" at Step S9 in FIG. 6A, the ratio of $A_I$ and $A_O$ ($A_I/A_O$) and the ratio of $B_I$ and $B_O$ ($B_I/B_O$) are compared. The equation is true when the ratio of $A_I$ and $A_O$ is larger. The equation is false when the ratio of $A_I$ and $A_O$ is not larger. At the same time, the evaluation equation "$A_I \times B_O > B_I \times A_O$" at Step S9 in FIG. 6B is not based on ratios. The product of $A_I$ multiplied by a weighted value $B_O$ and the product of $A_O$ multiplied by a weighted value $B_I$ are compared. The evaluated equation is true when the product of $A_I$ multiplied by the weighted value $B_O$ is larger. The evaluated equation is false when the product of $A_I$ multiplied by the weighted value $B_O$ is not larger. The results of the two evaluation equations are almost equal.

Figures 7A, 7B:
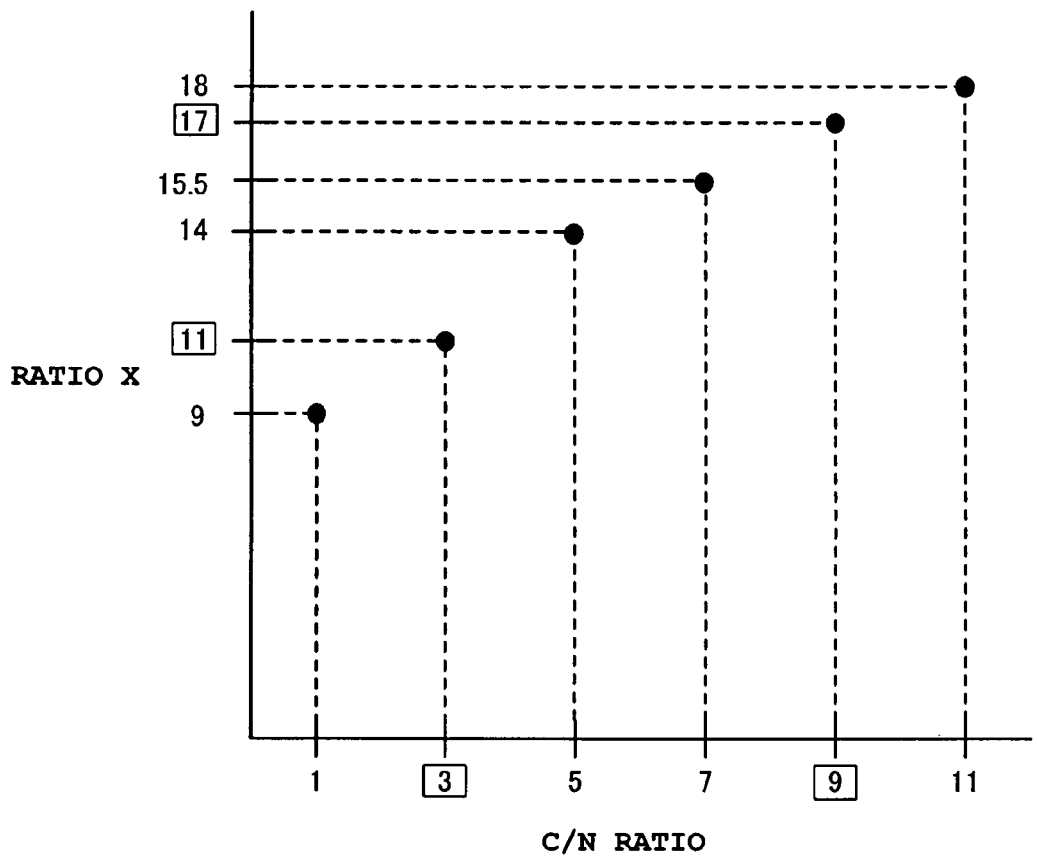
FIG. 7A is a diagram showing an example of calculation results of a first moving average integration value and a second moving average integration value.
FIG. 7B is a diagram showing a relationship between a ratio X and a C/N ratio.

FIG. 7A is a diagram showing an example of the calculation results of the first moving average integration value and the second moving average integration value. In FIG. 7A, the calculation results of the symbol numbers 1 to 6 are shown for sake of simplicity. In other words, the C/N ratio of symbol number 1 is 1. The integration result of the integration period within guard interval Sa (first moving average integration value) is 5400. The integration result of the integration period outside of guard interval Sb (second moving average integration value) is 600. The ratio (equivalent to $A_I/A_O$ or $B_I/B_O$ in the above-described evaluation equation [hereinafter, referred to as X]) is 9.

The C/N ratio of symbol number 2 is 3. The integration result of the integration period within guard interval Sa (first moving average integration value) is 5280. The integration result of the integration period outside of guard interval Sb (second moving average integration value) is 480. The ratio (equivalent to X) is 11. The C/N ratio of symbol number 3 is 5. The integration result of the integration period within guard interval Sa (first moving average integration value) is 5180. The integration result of the integration period outside of guard interval Sb (second moving average integration value) is 370. The ratio (equivalent to X) is 14. The C/N ratio of symbol number 4 is 7. The integration result of the integration period within guard interval Sa (first moving average integration value) is 5115. The integration result of the integration period outside of guard interval Sb (second moving average integration value) is 330. The ratio (equivalent to X) is 15.5. The C/N ratio of symbol number 5 is 9. The integration result of the integration period within guard interval Sa (first moving average integration value) is 5100. The integration result of the integration period outside of guard interval Sb (second moving average integration value) is 300. The ratio (equivalent to X) is 17. The C/N ratio of symbol number 6 is 11. The integration result of the integration period within guard interval Sa (first moving average integration value) is 5040. The integration result of the integration period outside of guard interval Sb (second moving average integration value) is 280. The ratio (equivalent to X) is 18.

With reference to FIG. 7A, a prima facie relationship between the C/N ratio and the ratio X can be seen. In other words, the relationship is that in which the larger the ratio X, the larger the obtained C/N ratio is. The evaluation example using the relationship is "$A_I/A_O > B_I/B_O$", described above.

FIG. 7B is a diagram showing the relationship between the ratio X and the C/N ratio. In FIG. 7B, the vertical axis indicates the ratio X. The horizontal axis indicates the C/N ratio. As can be understood from the diagram, the higher the ratio X, the larger the value of the C/N ratio. As described earlier, the C/N ratio is the ratio of the additional noise power (N) and the signal power at the reception point. Therefore, the C/N ratio is preferably as large as possible. For example, a C/N ratio of 9 is naturally more preferable than a C/N ratio of 3. In FIG. 7B, the ratio X of the C/N ratio 3 is 11. The ratio X of the C/N ratio 9 is 17. Under the assumption that the C/N ratio of the antenna A is 9 and the C/N ratio of the antenna B is 3, the ratio X corresponding to each C/N ratio is assigned to $A_I/A_O$ and $B_I/B_O$, $A_I/A_O = 17$ and $B_I/B_O = 11$. "17>11" and, as a result, the evaluation equation "$A_I/A_O > B_I/B_O$" becomes true. In this case, the C/N ratio of the antenna A is judged to be favorable. As in the assumption, the C/N ratio of the antenna A is 9 and the C/N ratio of the antenna B is 3. Therefore, the judgment result is correct.

The integration result (first moving average integration values: $A_I$, $B_I$) of the integration period within guard interval Sa is the moving average integration value of the information in the guard interval period and the information in the end portion of the effective symbol period subsequent to the guard interval period. Both information are originally the same information (therefore, are correlated). Accordingly, the first moving average integration values ($A_I$ and $B_I$) naturally indicate a large value.

At the same time, the integration result (second moving average integration values: $A_O$ and $B_O$) of the integration period outside of guard interval Sb is the integration result of the non-delay symbol and the delay symbol in a period of which the margin period M is removed from the effective symbol period Tu. The information in the respective effective symbol periods Tu of the non-delay symbol and the delay symbol differs. Therefore, ordinarily, correlation cannot be seen between the information (the information in the respective effective symbol periods of the non-delay symbol and the delay symbol).

However, in an experiment conducted by the inventors and the like of the present invention, when a strong white noise is applied because of a change in the transmission line (the effect of the multipath can be considered to be white noise because the effect is symbol interference between numerous carriers), a certain amount of correlation can occasionally be seen even in, for example, the integration period outside of guard interval Sb.

The reason is presumed to be as follows. Here, the information originally included in the effective symbol is "true information". When there is no multipath (no white noise), the integration result (second moving average integration values: $A_O$ and $B_O$) of the integration period outside of guard interval Sb does not become large even when similar information (true information) are included in the respective effective symbols of the non-delay symbol and the delay symbol. This is because, as described above, the information in the respective effective symbol periods Tu of the non-delay symbol and the delay symbol differ. However, when the information generated because of the white noise (hereinafter, referred to as false information) is added to the true information, the false information is stochastically mistaken for the true information. In correspondence with the frequency of the mistake, the integration results of the (second moving average integration values: $A_O$ and $B_O$) integration period outside of guard interval Sb indicate a large value.

In this way, conventionally, the respective effective symbol periods Tu of the non-delay symbol and the delay symbol were understood to have "no correlation" almost as common knowledge. However, the inventors and the like of the present invention focused on the fact that, from appearance, correlation seems to be indicated depending on the size of the multipath. The inventors and the like of the present invention conceived that, if the state of the transmission line is grasped using this phenomenon, antenna switch judgment to which selection diversity is applied can be performed even during the effective symbol period.

In other words, as shown in FIG. 7B, as the C/N ratio deteriorates (C/N ratio becomes small), the ratio X ($A_I/A_O$ or $B_I/B_O$) of the integration period within guard interval Sa and the integration period outside of guard interval Sb becomes small. Therefore, a pseudo signal state can be known from the ratio X. Accordingly, the antenna switch control circuit 6 respectively performs the above-described integration (calculation of the first moving average integration value and the second moving average integration value) and the calculation of the ratio X for the antenna A and the antenna B. The antenna switch control circuit 6 compares the ratio X of the antenna A ($A_I/A_O$) and the ratio X of the antenna B ($B_I/B_O$). The antenna switch control circuit 6 judges that the C/N ratio of the antenna A is favorable when the ratio X of the antenna A is larger and that the C/N ratio of the antenna B is favorable when the ratio X of the antenna B is larger. Depending on the judgment result, the antenna switch control circuit 6 outputs the signal for switching the antenna (antenna switch control signal SEL) as required to the antenna switch circuit 5.

Therefore, according to the present embodiment, a judgment of whether the transmission line state is favorable (equivalent to the judgment of whether the C/N ratio is favorable) can be performed based on the ratio X ($A_I/A_O$ or $B_I/B_O$), even in the effective symbol period Tu that is a period other than the guard interval period Tg. Even when the transmission line state suddenly changes within the effective symbol period Tg, the change can be responded to promptly. Therefore, instantaneous symbol loss does not occur. Furthermore, by a combination of the technology according to the present embodiment and the conventional prior art (judgment of whether the transmission line is favorable only for the guard interval period Tg), the judgment of whether the transmission line is favorable can be performed over almost all periods of the symbol. As a result, the countermeasure against instantaneous symbol loss can be taken with more certainty.

As explained above, in the evaluation equation "$A_I \times B_O > B_I \times A_O$" at Step S9 in FIG. 6B, the product of $A_I$ multiplied by a weighted value $B_O$ and the product of $B_I$ multiplied by a weighted value $A_O$ are compared. The evaluated equation is true when the product of $A_I$ multiplied by a weighted value $B_O$ is larger. The evaluated equation is false when the product of $A_I$ multiplied by a weighted value $B_O$ is not larger. The same result as the evaluation equation "$A_I/A_O > B_I/B_O$" using ratios can be obtained using the evaluation equation using the weighted values.

The reason is because, when the C/N ratio is favorable, $A_I$ or $B_I$ indicates a large value and $A_O$ or $B_O$ indicates a small value. At the same time, when the C/N ratio is not favorable, $A_I$ or $B_I$ indicates a small value and $A_O$ or $B_O$ indicates a large value. Therefore, as in the evaluation equation "$A_I/A_O > B_I/B_O$" using ratios, when the C/N ratio of the antenna A is favorable, the result of the evaluation equation "$A_I \times B_O > B_I \times A_O$" is true. On the other hand, when the C/N ratio of the antenna B is favorable, the result of the evaluation equation "$A_I \times B_O > B_I \times A_O$" is false. The evaluation equation (using ratios/using weighted values) to be used can be decided solely based on the performance requirements of the system.

A common point of the two evaluation equations ("$A_I/A_O > B_I/B_O$" and "$A_I \times B_O > B_I \times A_O$") is that both equations have both the correlation information of the guard interval period Tg ($A_I$ and $B_I$) and the correlation information of the non-guard interval period Tg (in other words, the effective symbol period Tu) ($A_O$ and $B_O$). The correlation information of the guard interval period Tg ($A_I$ and $B_I$) is, for example, conventionally used in the C/N ratio comparison, as can be seen in the conventional prior art in the beginning of the present specification. However, the idea of using the correlation information of the non-guard interval period Tg (in other words, the effective symbol period Tu) ($A_O$ and $B_O$) did not exist until now. This is because the information in the effective symbol periods Tu of the non-delay symbol and the delay symbol differed.

Therefore, the conventional C/N ratio comparison is based only on the correlation information of the guard interval period Tg ($A_I$ and $B_I$). Simply put, the equation "$A_I > B_I$" is evaluated. If the result of the evaluation is true, the C/N ratio of one antenna is judged to be favorable. If the result of the evaluation is false, the C/N ratio of the other antenna is judged to be favorable. A disadvantage of the evaluation equation ("$A_I > B_I$") is that sudden changes in the transmission line state in the non-guard interval Tg (in other words, the effective symbol period Tu) cannot be handled at all.

On the other hand, according to the present embodiment, the evaluation equation ("$A_I/A_O > B_I/B_O$" or "$A_I \times B_O > B_I \times A_O$") including not only the correlation information of the guard interval period Tg ($A_I$ and $B_I$), but also the correlation information of the non-guard interval period Tg (in other words, the effective symbol period Tu) ($A_O$ and $B_O$), is used. Therefore, the sudden changes in the transmission line state in the non-guard interval Tg (in other words, the effective symbol period Tu) can be grasped based on the correlation information of the non-guard interval period Tg (in other words, the effective symbol period Tu) ($A_O$ and $B_O$).

In other words, when a sudden change in the transmission line state in the non-guard interval Tg (in other words, the effective symbol period Tu) occurs, the values of the $A_O$ and $B_O$ change. Therefore, the required countermeasure (antenna switching of selection diversity antenna) corresponding to the sudden change can be taken promptly.

In this way, according to the present embodiment, there are clear structural differences from the conventional prior art. Because of the differences, the present invention according to the present embodiment is exceptionally superior to the conventional prior art in that sudden changes in the transmission line state in the non-guard interval Tg (in other words, the effective symbol period Tu) can be handled promptly.

In other words, according to the present embodiment, it can be said that the second moving average integration values ($A_O$ and $B_O$) indicate whether there is excessive false information or, in other words, whether the transmission line state is favorable (namely, whether the C/N ratio is favorable). Therefore, for example, the ratio of the second moving average integration values ($A_O$ and $B_O$) and the first moving average integration values ($A_I$ and $B_I$) or, in other words, the ratio of $A_I$ and $A_O$ and the ratio of $B_I$ and $B_O$ can be determined. By comparison of the two ratios, which C/N ratio of one antenna and another antenna is more favorable can be judged for the period other than the guard interval Tg (the effective symbol period Tu).

Alternatively, the same result can be obtained without using ratios, for example, by a comparison of the product of $A_I$ multiplied by a weighted value $B_O$ and the product of $B_I$ multiplied by a weighted value $A_O$.

Therefore, antenna diversity in which one antenna is selected from among a plurality of antennas or, in other words, a judgment of antenna selection in selection diversity that does not cause an increase in hardware size can be performed in the effective symbol period Tu as well. An OFDM receiver, an OFDM receiving method, and a terrestrial digital receiver can be provided at a low cost and with superior immediacy in antenna selection.

While the present invention has been described with reference to the preferred embodiments, it is intended that the invention be not limited by any of the details of the description therein but includes all the embodiments which fall within the scope of the appended claims.

What is claimed is:

1. An Orthogonal Frequency Division Multiplexing (OFDM) receiver comprising:
   an antenna selecting means for sequentially selecting at least two antennas;
   a non-delay symbol outputting means for, when one antenna is selected by the antenna selecting means, outputting a symbol of an OFDM signal received by the one antenna as a first non-delay symbol and, when another antenna is selected by the antenna selecting means, outputting a symbol of an OFDM signal received by the other antenna as a second non-delay symbol;
   a delay symbol outputting means for, when one antenna is selected by the antenna selecting means, delaying a symbol of an OFDM signal received by the one antenna by a predetermined amount of time T−Tg equivalent to a difference of a symbol period T of the OFDM signal and a guard interval period Tg and outputting the delayed symbol as a first delay symbol and, when another antenna is selected by the antenna selecting means, delaying a symbol of an OFDM signal received by the other antenna by a predetermined amount of time T−Tg equivalent to a difference of a symbol period T of the OFDM signal and a guard interval period Tg and outputting the delayed symbol as a second delay symbol;
   a first calculating means for calculating a first moving average integration value (first moving average integration value: $A_I$) of the first non-delay symbol and the first delay symbol in the guard interval period Tg and calculating a second moving average integration value (second moving average integration value: $B_I$) of the second non-delay symbol and the second delay symbol in the guard interval period Tg;
   a second calculating means for calculating a third moving average integration value (third moving average integration value: $A_O$) of the first non-delay symbol and the first delay symbol in an effective symbol period Tu subsequent to the guard interval period Tg and calculating a fourth moving average integration value (fourth moving average integration value: $B_O$) of the second non-delay symbol and the second delay symbol in an effective symbol period Tu subsequent to the guard interval period Tg; and a judging means for judging which C/N ratio of the two antennas selected by the antenna selecting means is favorable based on the first and second moving average integration values ($A_I$ and $B_I$) and the third and fourth moving average integration values ($A_O$ and $B_O$).

2. The OFDM receiver according to claim 1, wherein:
   the judging means compares a ratio of $A_I$ and $A_O$ and a ratio of $B_I$ and $B_O$, judges that the C/N ratio of the one antenna is favorable when the ratio of $A_I$ and $A_O$ is larger, and judges that C/N ratio of the other antenna is favorable when the ratio of $A_I$ and $A_O$ is not larger.

3. The OFDM receiver according to claim 1, wherein:
   the judging means compares a product of $A_I$ to which a weighted value ($B_O$) is applied and a product of $B_I$ to which a weighted value ($A_O$) is applied, judges that the C/N ratio of the one antenna is favorable when the product of $A_I$ to which the weighted value ($B_O$) is applied is larger, and judges that C/N ratio of the other antenna is favorable when the product of $A_I$ to which the weighted value ($B_O$) is applied is not larger.

4. The OFDM receiver according to claim 1, wherein:
   the antenna selecting means selects the antenna during the guard interval period Tg of the OFDM signal.

5. An Orthogonal Frequency Division Multiplexing (OFDM) reception method comprising:
   an antenna selecting process for sequentially selecting at least two antennas;
   a non-delay symbol outputting process for, when one antenna is selected by the antenna selecting process, outputting a symbol of an OFDM signal received by the one antenna as a first non-delay symbol and, when another antenna is selected by the antenna selecting process, outputting a symbol of an OFDM signal received by the other antenna as a second non-delay symbol;
   a delay symbol outputting process for, when one antenna is selected by the antenna selecting process, delaying a symbol of an OFDM signal received by the one antenna by a predetermined amount of time T−Tg equivalent to a difference of a symbol period T of the OFDM signal and a guard interval period Tg and outputting the delayed symbol as a first delay symbol and, when another antenna is selected by the antenna selecting process, delaying a symbol of an OFDM signal received by the other antenna by a predetermined amount of time T−Tg equivalent to a difference of a symbol period T of the OFDM signal and a guard interval period Tg and outputting the delayed symbol as a second delay symbol;
   a first calculating process for calculating a first moving average integration value (first moving average integration value: $A_I$) of the first non-delay symbol and the first delay symbol in the guard interval period Tg and calculating a second moving average integration value (second moving average integration value: $B_I$) of the second non-delay symbol and the second delay symbol in the guard interval period Tg;
   a second calculating process for calculating a third moving average integration value (third moving average integration value: $A_O$) of the first non-delay symbol and the first delay symbol in an effective symbol period Tu subsequent to the guard interval period Tg and calculating a fourth moving average integration value (fourth moving average integration value: $B_O$) of the second non-delay symbol and the second delay symbol in an effective symbol period Tu subsequent to the guard interval period Tg; and a judging process for judging which C/N ratio of the two antennas selected by the antenna selecting process is favorable based on the first and second moving average integration values ($A_I$ and $B_I$) and the third and fourth moving average integration values ($A_O$ and $B_O$).

6. The OFDM reception method according to claim 5, wherein:

the judging process compares a ratio of $A_I$ and $A_O$ and a ratio of $B_I$ and $B_O$, judges that the C/N ratio of the one antenna is favorable when the ratio of $A_I$ and $A_O$ is larger, and judges that C/N ratio of the other antenna is favorable when the ratio of $A_I$ and $A_O$ is not larger.

7. The OFDM reception method according to claim 5, wherein:

the judging process compares a product of $A_I$ to which a weighted value ($B_O$) is applied and a product of $B_I$ to which a weighted value ($A_O$) is applied, judges that the C/N ratio of the one antenna is favorable when the product of $A_I$ to which the weighted value ($B_O$) is applied is larger, and judges that C/N ratio of the other antenna is favorable when the product of $A_I$ to which the weighted value ($B_O$) is applied is not larger.

8. A terrestrial digital receiver for receiving and demodulating an Orthogonal Frequency Division Multiplexing (OFDM) signal of a terrestrial digital broadcasting and decoding the OFDM signal, the terrestrial digital receiver comprising:

an antenna selecting means for sequentially selecting at least two antennas;

a non-delay symbol outputting means for, when one antenna is selected by the antenna selecting means, outputting a symbol of an OFDM signal received by the one antenna as a first non-delay symbol and, when another antenna is selected by the antenna selecting means, outputting a symbol of an OFDM signal received by the other antenna as a second non-delay symbol;

a delay symbol outputting means for, when one antenna is selected by the antenna selecting means, delaying a symbol of an OFDM signal received by the one antenna by a predetermined amount of time T−Tg equivalent to a difference of a symbol period T of the OFDM signal and a guard interval period Tg and outputting the delayed symbol as a first delay symbol and, when another antenna is selected by the antenna selecting means, delaying a symbol of an OFDM signal received by the other antenna by a predetermined amount of time T−Tg equivalent to a difference of a symbol period T of the OFDM signal and a guard interval period Tg and outputting the delayed symbol as a second delay symbol;

a first calculating means for calculating a first moving average integration value (first moving average integration value: $A_I$) of the first non-delay symbol and the first delay symbol in the guard interval period Tg and calculating a second moving average integration value (second moving average integration value: $B_I$) of the second non-delay symbol and the second delay symbol in the guard interval period Tg;

a second calculating means for calculating a third moving average integration value (third moving average integration value: $A_O$) of the first non-delay symbol and the first delay symbol in an effective symbol period Tu subsequent to the guard interval period Tg and calculating a fourth moving average integration value (fourth moving average integration value: $B_O$) of the second non-delay symbol and the second delay symbol in an effective symbol period Tu subsequent to the guard interval period Tg; and a judging means for judging which C/N ratio of the two antennas selected by the antenna selecting means is favorable based on the first and second moving average integration values ($A_I$ and $B_I$) and the third and fourth moving average integration values ($A_O$ and $B_O$).

9. The terrestrial digital receiver according to claim 8, wherein:

the judging means compares a ratio of $A_I$ and $A_O$ and a ratio of $B_I$ and $B_O$, judges that the C/N ratio of the one antenna is favorable when the ratio of $A_I$ and $A_O$ is larger, and judges that C/N ratio of the other antenna is favorable when the ratio of $A_I$ and $A_O$ is not larger.

10. The terrestrial digital receiver according to claim 8, wherein:

the judging means compares a product of $A_I$ to which a weighted value ($B_O$) is applied and a product of $B_I$ to which a weighted value ($A_O$) is applied, judges that the C/N ratio of the one antenna is favorable when the product of $A_I$ to which the weighted value ($B_O$) is applied is larger, and judges that C/N ratio of the other antenna is favorable when the product of $A_I$ to which the weighted value ($B_O$) is applied is not larger.

11. An Orthogonal Frequency Division Multiplexing (OFDM) receiver comprising:

a plurality of antenna connection terminals to which an antenna can be connected;

an antenna switching means for selecting one antenna connection terminal from among the plurality of antenna connection terminals and switching an antenna receiving an OFDM signal;

a symbol synchronization generating means for generating a symbol synchronization signal that is synchronous with a symbol, based on a correlation value of an OFDM signal received by an antenna connected to the antenna connection terminal and a signal that is the OFDM signal delayed by an effective symbol period;

a synchronous clock generating means for generating a synchronous clock signal that is synchronous with a guard interval period and an effective symbol period from the symbol synchronization signal generated by the symbol synchronization generating means;

a frame number generating means for generating a frame number corresponding with each frame of the OFDM signal from the OFDM signal received by the antenna connected to the antenna connection terminal;

a storing means for storing a predetermined frame number;

a judging means for comparing the frame number generated by the frame number generating means and the value stored in the storing means and judging whether the frame number and the value match;

a first integrating means for, when judged by the judging means that the frame number generated by the frame number generating means and the value stored in the storing means match, sampling the symbol synchronization signal generated by the symbol synchronization generating means with a synchronous clock that is synchronous to the guard interval period generated by the synchronous clock generating means and determining a first integration value;

a second integrating means for sampling the symbol synchronization signal generated by the symbol synchronization generating means with a synchronous clock that is synchronous to the effective symbol period generated by the synchronous clock generating means and determining a second integration value;

a third integrating means for sampling the symbol synchronization signal generated by the symbol synchronization generating means after the antenna is switched by the antenna switching means with a synchronous clock that is synchronous to the guard interval period generated by the synchronous clock generating means and determining a third integration value;

a fourth integrating means for sampling the symbol synchronization signal generated by the symbol synchronization generating means with a synchronous clock that is synchronous to the effective symbol period generated by the synchronous clock generating means and determining a fourth integration value; and an antenna switch judging means for judging whether to switch the antenna based on the first to fourth integration value determined by the first to fourth integrating means;

wherein, when judged by the antenna switch judging means that the antenna is switched, the antenna switching means switches the antenna at a timing synchronous with the symbol synchronization signal generated by the symbol synchronization means.

12. The OFDM receiver according to claim 11, wherein:
the antenna switch judging means includes a comparing means for comparing a value that is the first integration value divided by the second integration value and a value that is the third integration value divided by the fourth integration value; and
the antenna switching means switches the antenna when the value that is the third integration value divided by the fourth integration value is smaller than the value that is the first integration value divided by the second integration value, as a result of the comparison by the comparing means.

13. The OFDM receiver according to claim 11, wherein:
the antenna switch judging means includes a comparing means for comparing a value that is a product of the first integration value and the fourth integration value and a value that is a product of the third integration value and the second integration value; and
the antenna switching means switches the antenna when the product of the first integration value and the fourth integration value is larger than the value that is the product of the third integration value and the second integration value, as a result of the comparison by the comparing means.

14. The OFDM receiver according to claim 11, wherein:
the antenna switching means switches the antenna during the guard interval period.

15. An Orthogonal Frequency Division Multiplexing (OFDM) reception method comprising:
an antenna switching process for selecting one antenna connection terminal from among the plurality of antenna connection terminals and switching an antenna receiving an OFDM signal;
a symbol synchronization generating process for generating a symbol synchronization signal that is synchronous with a symbol, based on a correlation value of an OFDM signal received by an antenna connected to the antenna connection terminal and a signal that is the OFDM signal delayed by an effective symbol period;

a synchronous clock generating process for generating a synchronous clock signal that is synchronous with a guard interval period and an effective symbol period from the symbol synchronization signal generated by the symbol synchronization generating process;

a frame number generating process for generating a frame number corresponding with each frame of the OFDM signal from the OFDM signal received by the antenna connected to the antenna connection terminal;

a storing process for storing a predetermined frame number;

a judging process for comparing the frame number generated by the frame number generating process and the value stored in the storing process and judging whether the frame number and the value match;

a first integrating process for, when judged by the judging process that the frame number generated by the frame number generating process and the value stored in the storing process match, sampling the symbol synchronization signal generated by the symbol synchronization generating process with a synchronous clock that is synchronous to the guard interval period generated by the synchronous clock generating process and determining a first integration value;

a second integrating process for sampling the symbol synchronization signal generated by the symbol synchronization generating process with a synchronous clock that is synchronous to the effective symbol period generated by the synchronous clock generating process and determining a second integration value;

a third integrating process for sampling the symbol synchronization signal generated by the symbol synchronization generating process after the antenna is switched by the antenna switching process with a synchronous clock that is synchronous to the guard interval period generated by the synchronous clock generating process and determining a third integration value;

a fourth integrating process for sampling the symbol synchronization signal generated by the symbol synchronization generating process with a synchronous clock that is synchronous to the effective symbol period generated by the synchronous clock generating process and determining a fourth integration value; and an antenna switch judging process for judging whether to switch the antenna based on the first to fourth integration value determined by the first to fourth integrating process;

wherein, when judged by the antenna switch judging process that the antenna is switched, the antenna switching process switches the antenna at a timing synchronous with the symbol synchronization signal generated by the symbol synchronization process.

16. The OFDM reception method according to claim 15, wherein:
the antenna switch judging process includes a comparing process for comparing a value that is the first integration value divided by the second integration value and a value that is the third integration value divided by the fourth integration value; and
the antenna switching process switches the antenna when the value that is the third integration value divided by the fourth integration value is smaller than the value that is the first integration value divided by the second integration value, as a result of the comparison by the comparing process.

17. The OFDM reception method according to claim 15, wherein:

the antenna switch judging process includes a comparing process for comparing a value that is a product of the first integration value and the fourth integration value and a value that is a product of the third integration value and the second integration value; and the antenna switching process switches the antenna when the product of the first integration value and the fourth integration value is larger than the value that is the product of the third integration value and the second integration value, as a result of the comparison by the comparing process.

18. The OFDM reception method according to claim 15, wherein:
the antenna switching process switches the antenna during the guard interval period.

* * * * *